Dec. 2, 1941.　　　　　S. LANDELL　　　　　2,264,637
VEHICLE CONSTRUCTION
Filed April 10, 1937　　　2 Sheets-Sheet 1
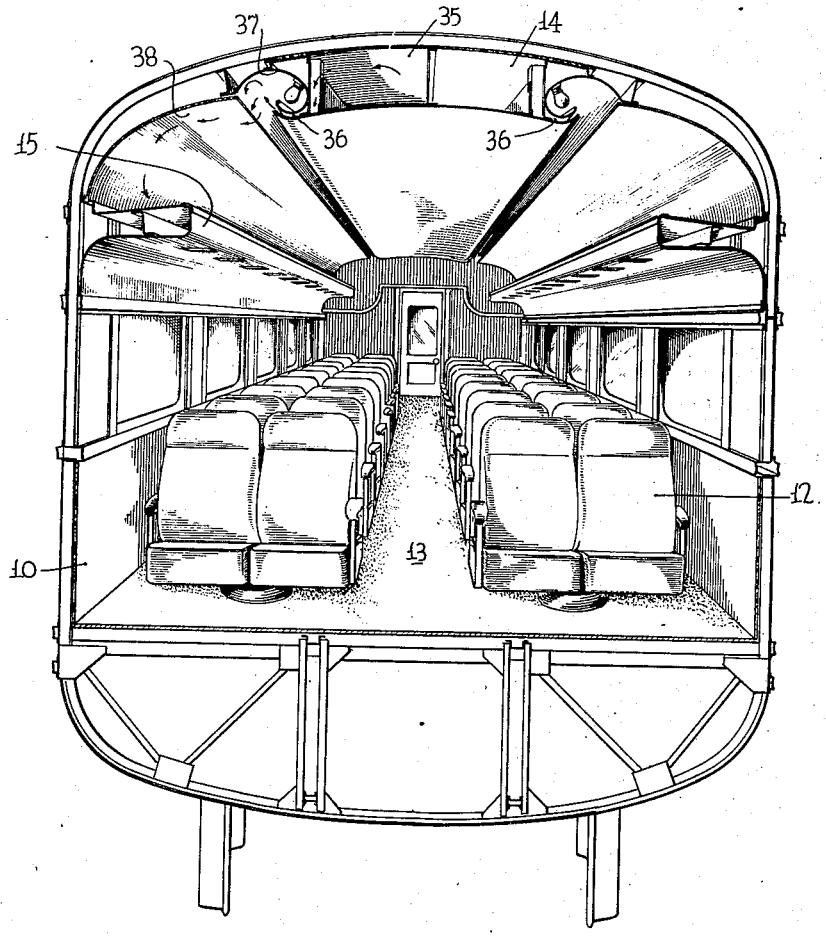
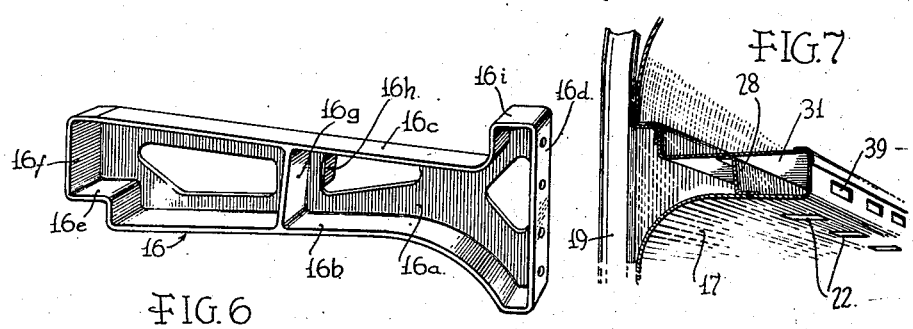
INVENTOR.
STANFORD LANDELL
BY
John P. Fairbox
ATTORNEY.

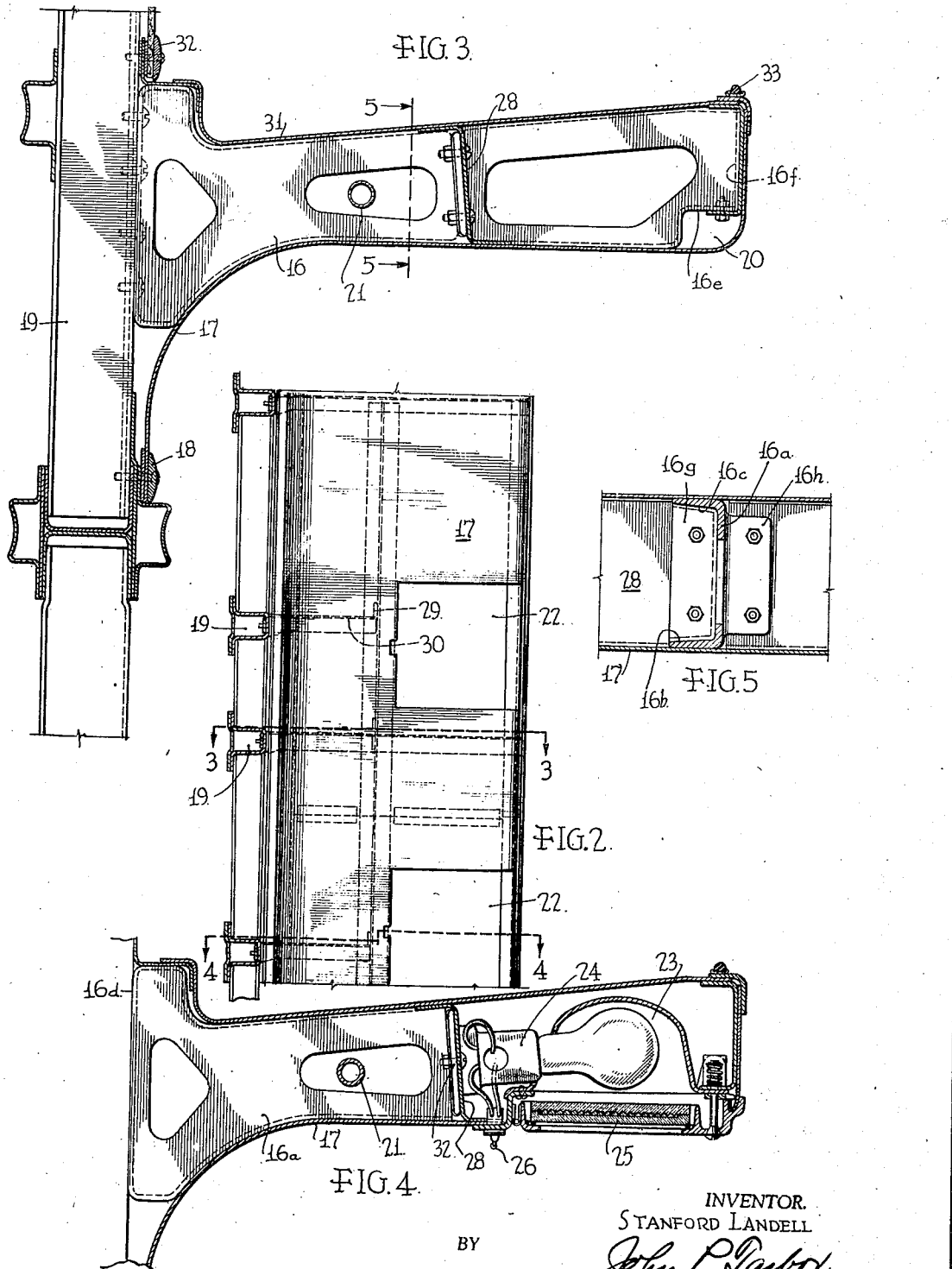

Patented Dec. 2, 1941

2,264,637

UNITED STATES PATENT OFFICE 2,264,637

VEHICLE CONSTRUCTION

Stanford Landell, Detroit, Mich., assignor to Edward G. Budd Manufacturing Company, Philadelphia, Pa., a corporation of Pennsylvania Application April 10, 1937, Serial No. 136,196

16 Claims. (Cl. 105—329)

This invention relates to improvements in vehicle construction and more particularly to a baggage rack therefor.

One of the principal objects of the invention is to provide an improved baggage rack for the interior of a vehicle body in which provision is made for individual light support adjacent the passenger seats, such rack being of light weight and simplified construction.

Another object of the invention is to provide a baggage rack for vehicles which can be built as a sub-assembly and readily installed in the vehicle body, such rack having a skeleton reinforcement and being of stiff box section.

A further and more specific object of the invention is to provide an improved baggage rack for a passenger coach which can be faired into the wall surface for increased decorative appearance, and which will have laterally outwardly supported individual lights carried by the tray portion between supporting brackets to facilitate desired spacing of the lights.

Further features and advantages of my invention will appear from the following description of a preferred form of embodiment thereof taken in connection with the attached drawings, in which, Fig. 1 is an interior view of a passenger coach of the rail type;

Fig. 2 is a partial bottom plan view of the baggage rack showing one form of attachment to a side frame, the posts of which are in section;

Fig. 3 is a vertical cross section taken substantially along the line 3—3 of Fig. 2;

Fig. 4 is a horizontal cross section in the light housing region taken substantially along the line 4—4 of Fig. 2;

Fig. 5 is a vertical cross section taken substantially along the line 5—5 of Fig. 3;

Fig. 6 is a perspective view of a supporting bracket, and

Fig. 7 is a perspective view of a modified construction of baggage rack.

The vehicle body generally indicated at 10 in Fig. 1 is of the passenger type and, although shown as a rail car, may be of any vehicular type normally having a plurality of rows of seats 12 extending along the walls of the body and providing a center aisle 13. In such a vehicle body, it is customary to have some means of taking care of the baggage carried by the passengers and for this purpose, a plurality of baggage racks are provided which extend out from the walls above the heads of the passengers and on which the personal luggage may be placed.

In accordance with one form of embodiment of my invention, the baggage rack, generally indicated by the character 15, is preferably of closed type and, as shown in Fig. 3, it includes a plurality of outwardly projecting brackets 16, the under portions of which are joined by a plate 17 suitably faired into the wall structure and attached at the bottom, for example, through a suitable moulding 18 to the framework represented by posts 19. This particular bracket 16 preferably has a substantially vertically projecting web portion 16a and a plurality of top and bottom flange portions 16b and 16c which give the bracket substantial stiffness. The bracket is also provided with an attaching flange 16d which is adapted to be screwed or otherwise attached to the posts 19 in Fig. 3.

The bracket 16 may also be provided with an inturned portion 16e which, as shown in Fig. 3, provides a pocket 20 with the plate 17 so that the plate 17 may be readily formed of a curved nature closely fitting the main flange portions 16b and 16f of the bracket. The web of the bracket is conveniently apertured and if desired, a suitable electric conduit, generally indicated at 21 may be extended therethrough.

At suitably spaced portions, the bottom plate or tray 17 is apertured as at 22 to receive light brackets which include a reflector 23, light socket 24, lens housing 25, and a suitable individual switch 26. These parts are supported by suitable screws from the lower tray 17 and by a longitudinally extending stiffener 28 which may be of Z cross section and which runs substantially the full length of the baggage rack being connected to the projecting webs 16g and 16h of the brackets 16 and to suitable angle brackets 29 carried by the intermediate brackets 30. The lights may be placed in the exact locations desired with such an arrangement and the brackets may be spaced in accordance with the available wall supporting structure.

If desired, a top tray 31 may be provided, such tray being secured to the top flanges 16c of the bracket 16 and also being extended to the wall over the raised bumper portion 16i which prevents the luggage from marring the wall surface. This top tray is secured under moulding 32. If desired, a bumper member 33 may be provided at the top foremost edge of the baggage rack to prevent the luggage from sliding out.

The angular supporting brackets and the longitudinal stiffener together with the top and bottom tray forms a very rigid and light hollow box cross section rack which may be constructed as a sub-assembly unit and carried into the vehicle body to which attachment is readily arranged. This facilitates the individual assembly of the lights and conduits on a bench, thereby materially reducing the time required for installation of the lighting equipment.

The projection of the baggage racks from the walls and the substantially closed character of the baggage racks facilitates the air cooling of the vehicle body which may be conveniently carried out by means of the overhead discharge duct 35 which is provided with openings 36 below the overhead light reflectors 37. The air which discharges laterally outward tends to follow the curved ceiling portions 38 and the top tray 31 of the baggage rack will prevent the air currents from carrying downwardly over the heads of the passengers and will distribute them laterally outward into the main body of the vehicle. It is, of course, to be understood that if the overhead duct distribution is not particularly desired, the top tray or the outer lateral edge of the baggage rack might be suitably perforated as shown at 39 in Fig. 7 for lateral distribution of air.

Although a channel shape bracket 16 is shown, it is, of course, to be understood that the bracket would be substantially as strong if of Z cross section with one of the flanges oppositely directed from the other. It would be possible in such construction to make it entirely of sheet metal which is readily formed into Z cross section. It is also to be understood that the attachment of the brackets to the body structure may be through the web portion 16a and may be accomplished by welding if suitable materials are used.

While I have shown a preferred form of embodiment of my invention, I am aware that other modifications may be made thereto and I therefore desire a broad interpretation of my invention within the scope and spirit of the description herein and of the claims appended hereinafter.

What I claim is:

1. A baggage rack for vehicle bodies which comprises a unitary structure including a plurality of angular cross section brackets, a stiffener extending between said brackets and a sheathing secured to and enclosing said stiffener and said brackets.

2. A baggage rack for vehicle bodies which comprises a unitary structure including a plurality of angular cross section brackets, a stiffener extending between said brackets and a sheathing secured to and enclosing said stiffener and said brackets, said brackets having a substantially vertical web and laterally projecting flanges to which the stiffener and sheathing are secured.

3. A baggage rack for vehicle bodies which comprises a unitary structure including a plurality of angular cross section brackets, a stiffener extending between said brackets and a sheathing secured to and enclosing said stiffener and said brackets, said brackets having a notched portion adjacent the lower outer corner over which the sheathing extends.

4. A baggage rack for vehicle bodies which comprises a unitary structure including a plurality of angular cross section brackets, a stiffener extending between said brackets and a sheathing secured to and enclosing said stiffener and said brackets, said brackets having apertured bodies through which a conduit extends.

5. A baggage rack for a vehicle having side walls which comprises a plurality of outwardly projecting supporting brackets of angular cross section supported from said side walls and a sheathing for enclosing said brackets, said sheathing being secured to outwardly extending portions of said brackets and being secured to the side walls of said vehicle, and means to reinforce said sheathing comprising angular cross section members extending along the length of said sheathing and being attached to said brackets.

6. A baggage rack for vehicle bodies which comprises a unitary structure including a plurality of angular cross section brackets, a stiffener extending between said brackets and a sheathing secured to and enclosing said stiffener and said brackets, said rack being independently stiff and constructed as a sub-assembly unit.

7. A baggage rack for a vehicle having side walls which comprises a plurality of outwardly projecting supporting brackets of angular cross section supported from said side walls and a sheathing for enclosing said brackets, said sheathing being secured to laterally extending portions of said brackets and being secured to the side walls of said vehicle.

8. A baggage rack for a vehicle having side walls which comprises a plurality of outwardly projecting supporting brackets of angular cross section supported from said side walls and a sheathing for said brackets, said sheathing being secured to outwardly extending portions of said brackets and being secured to the side walls of said vehicles and a plurality of localized light sources in said sheathing intermediate said brackets.

9. A baggage rack for vehicle bodies which comprises a plurality of angular cross section outwardly projecting supporting brackets, means to attach said brackets to the vehicle body, a sheathing secured to the under portion of said brackets and being faired into the vehicle body and a second sheathing on top of and carried by said brackets adapted to receive baggage.

10. A baggage rack for a vehicle comprising an upper sheathing, a lower sheathing and a plurality of apertured brackets extending therebetween and enclosed thereby, said rack being of hollow cross section and having conduits between the upper and lower sheathing.

11. A baggage rack for a vehicle having a wall comprising an upper sheathing, a lower sheathing and a plurality of brackets extending therebetween and secured to the wall, said brackets having a web and laterally projecting flanges and means secured to adjacent brackets and spaced from the wall to reinforce the upper and lower sheathing between brackets.

12. A baggage rack for vehicle bodies which comprises a plurality of angular cross section outwardly projecting supporting brackets, means to attach said brackets to the vehicle body, a lower sheathing secured to the under portion of said brackets, an upper sheathing carried by said brackets adapted to receive baggage, said rack being of hollow box section and being independently self-supporting as a sub-assembly unit.

13. A baggage rack for vehicle bodies which comprises a plurality of angular cross section outwardly projecting supporting brackets the ends of which are attached to the vehicle body, a lower sheathing secured to the under portion of said brackets, an upper sheathing carried by said brackets adapted to receive baggage, said rack being hollow and having air distributing openings along a longitudinal surface thereof.

14. In a vehicle of the class described having side walls and passenger seats adjacent said side walls, an overhead air distributing duct adjacent the ceiling of said vehicle distributing air laterally of the vehicle body and means above the passenger seats and in line between the air distributing duct and the seats to baffle the air flow to avoid drafts adjacent the side walls of the vehicle body, said baffle means comprising an outwardly projecting closed shelf adapted to serve as a baggage rack.

15. In a vehicle of the class described having side walls and passenger seats extending along the side walls, light ducts running along the ceiling of said body and having lights therein for general illumination of the ceiling, and a plurality of localized lights directly above the respective car seats, said localized lights being supported by an outwardly projecting hollow cross section member which comprises a longitudinally extending shelf, the upper part of which is adapted to serve as a baggage rack and the inner part of which is adapted to serve as an air conditioning duct.

16. A baggage rack for vehicles having side walls, which comprises a continuous unobstructed shelf extending substantially the length of the vehicle and supported from the side walls, said shelf comprising substantially a box girder and having substantially totally enclosed therein at spaced intervals brackets secured to the walls.

STANFORD LANDELL.